May 31, 1927.

S. L. LAUGHLIN

UNIVERSAL JOINT

Filed Nov. 15, 1923

1,630,898

2 Sheets-Sheet 1

Inventor
S. L. Laughlin
By Hull, Birch & West
Attys.

May 31, 1927. 1,630,898
S. L. LAUGHLIN
UNIVERSAL JOINT
Filed Nov. 15, 1923 2 Sheets-Sheet 2
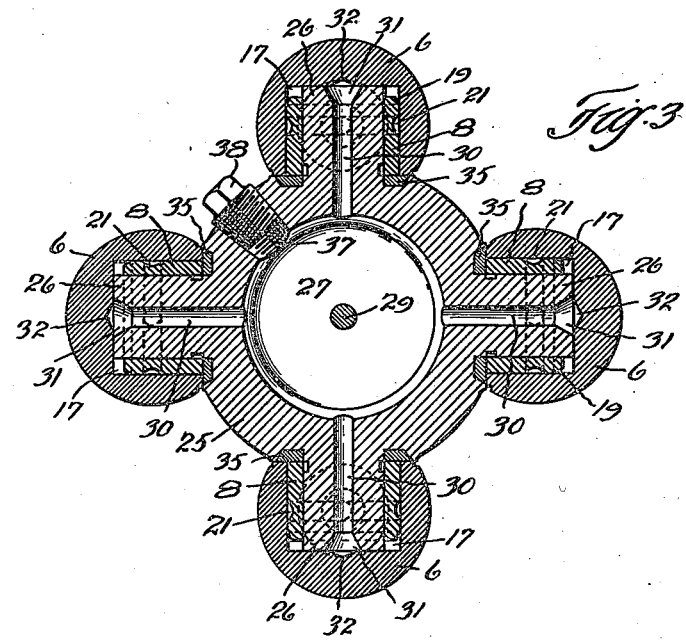
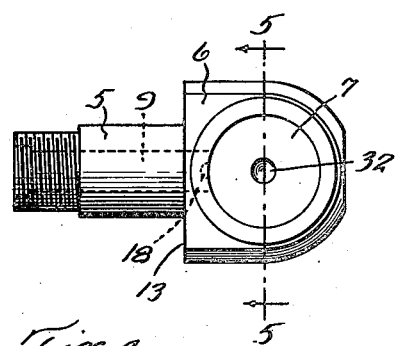
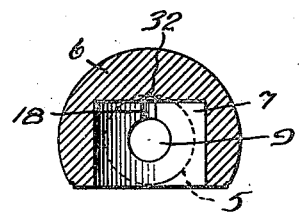

Patented May 31, 1927.

1,630,898

UNITED STATES PATENT OFFICE.

SAMUEL L. LAUGHLIN, OF CLEVELAND, OHIO, ASSIGNOR TO THE CLEVELAND UNIVERSAL PARTS COMPANY, OF CLEVELAND, OHIO, A CORPORATION OF OHIO.

UNIVERSAL JOINT.

Application filed November 15, 1923. Serial No. 674,834.

This invention relates to universal joints and refers more particularly to an improved form of construction and lubricating arrangement for such joints.

The primary object of the present invention is to provide a particularly efficient fluid-tight joint at the outer end of each of the trunnion pins so that light or thin commercial oil may be used to lubricate the moving parts of the joint without leakage.

A further object is to provide a universal joint which shall include means for effectively lubricating each trunnion pin from an auxiliary lubricating well and which shall include means for preventing leakage of lubricant between the inner ends of the bushings and the shoulders of the cross member with which they cooperate.

With these and other objects in view, the invention may be stated to consist in the provision of a universal joint having a central lubricating well and an auxiliary lubricating well for each trunnion and its bushing, such central well supplying the auxiliary wells with lubricant by centrifugal action, and there being a barrier or other means for relieving the pressure on the seals at the inner ends of the bushings so that said seals shall not be subjected to the pressure created by the aforesaid centrifugal action.

Figure 1:
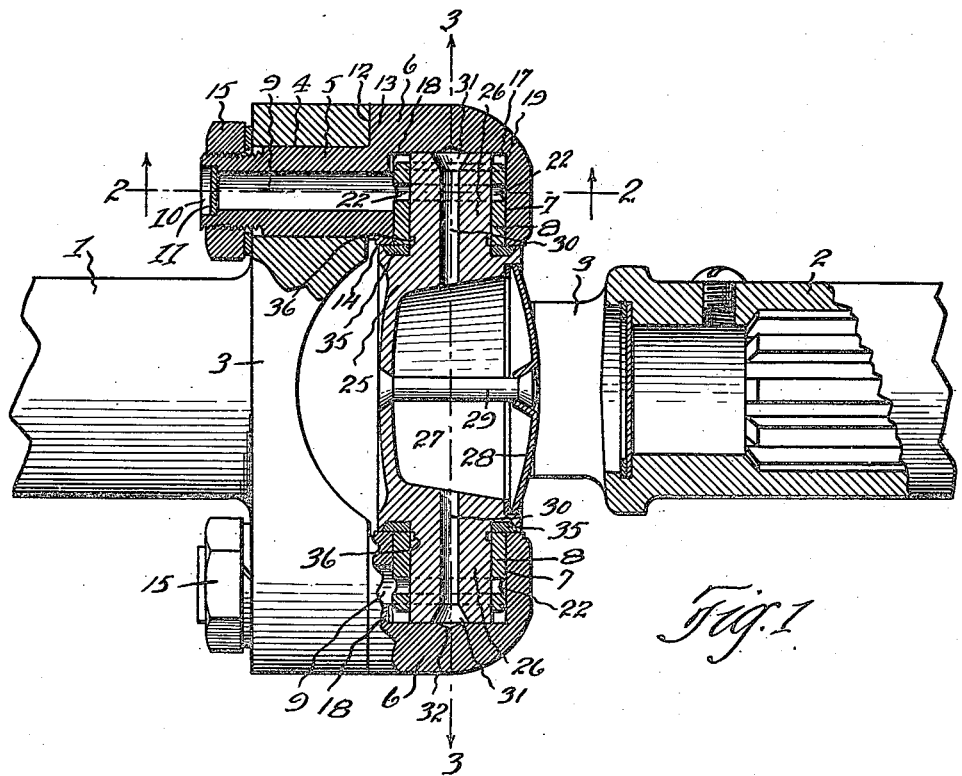
Figure 2:
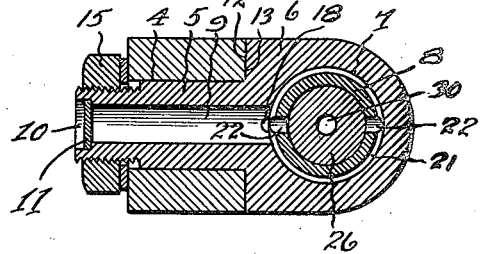
Figure 6:
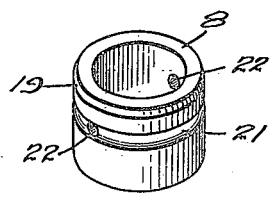

In the drawings accompanying and forming a part of this application, Fig. 1 is a view partly in elevation and partly in section of a universal joint constructed in accordance with my invention; Figs. 2 and 3 are sectional views taken respectively on the lines 2—2 and 3—3 of Fig. 1; Fig. 4 is a plan view of one of the bearing block elements; Fig. 5 is a sectional view taken on the line 5—5 of Fig. 4; and Fig. 6 is a perspective view of one of the bushings for the trunnion pins.

Describing the various parts by reference characters, 1 and 2 denote the hubs of my joint which are adapted to receive the ends of the shaft sections to be united. Each hub is provided with a transverse base or flange 3 and each end of these flanges is bored as indicated at 4 to receive a bearing block stud 5. As shown in Figs. 1 and 2 each bearing block 6 is recessed as indicated at 7 to receive a bushing 8 and this recess communicates with a bore 9 which extends through stud 5. For convenience in manufacture the stud 5 is drilled longitudinally, then counterbored as indicated at 10 to receive a disk or welch plug 11 which normally closes the outer end of the bore 9. The cooperating surfaces 12 and 13 of the flange and bearing block are preferably machined and provided with offset shoulder portions 14 to prevent rotation of said block with respect to the flange. The outer end of the stud 5 is threaded to receive a nut 15 which serves to draw the block in tight relation with the flange 3.

As shown in Figs. 1 and 3, each bushing 8 is spaced from the inner wall of the bearing block recess 7 to define a small reservoir 17 and this reservoir communicates with bore 9 through a small bore 18 formed in the bearing block along one side of the bushing. The inner end of each bushing is slightly beveled as indicated at 19 and the outer end thereof is preferably flush with the surface of the bearing block. A circumferential oil groove 21 is formed in bushing 8 in alignment with bore 9 and this groove is provided with diametrically opposed bores 22 which communicate with the inner surface of the bushing.

The cross is indicated generally at 25 and is formed with four trunnion pins 26 arranged in the usual manner. The central portion of the cross is formed with a cavity 27 which serves as the main lubricant reservoir, and the open side of this cavity is normally closed by a plate 28 which is held in position by a rivet 29 or other suitable fastening means. Each trunnion pin is bored as indicated at 30 so as to establish communication between the main reservoir and the outer end of the trunnion pin, such outer end being counterbored at 31 to cooperate with a similar counterbore 32 in the bottom wall of the bearing block recess 7 to form a small lubricant reservoir. The pinions are so constructed and are of such length as to provide a clearance of about .004 to .008 of an inch between their ends and the walls of the bearing blocks to allow the oil to seep past the ends of the trunnions.

The cross is recessed about each trunnion pin to receive a resilient packing washer 35 preferably of cork. This washer contacts with bushing 8 and bearing block 6 to form a fluid tight joint between the cross and bearing blocks. The small groove 36 extending circumferentially about the inner end of each trunnion pin is provided for purposes of grinding the trunnion pins so that sufficient clearance may be obtained for the grinding wheel.

In operation, lubricant is introduced into the main reservoir 27 through a suitable opening 37 which is normally closed by a plug 38. The centrifugal action due to rotation of the joint will force lubricant through bores 30 to the outer ends of the trunnion pins, there being a sufficient clearance between the ends of the pins and the walls of the bearing blocks to permit only a small seepage of lubricant thereby into the reservoirs 17, whereby to prevent excess pressure on the seals at the inner ends of the bushings as a result of the aforesaid centrifugal action. The lubricant in reservoirs 17 drains freely through their respective bores 18 into the auxiliary reservoirs 9 formed in the bearing block studs, and from these reservoirs the lubricant is free to flow about groove 21 and through bores 22 to lubricate the inner surfaces of the bushings and the bearing surfaces of the trunnion pins. From the foregoing, it will be obvious that the proximity of the end of each trunnion pin with its bearing block will materially reduce the pressure of lubricant due to the centrifugal action of the joint and will permit only sufficient lubricant to pass to maintain the auxiliary reservoirs full at all times. These auxiliary reservoirs hold sufficient lubricant to lubricate the trunnion pins and bushings for a considerable period of time. It will also be obvious that the packing washers 35 are relieved of all pressure due to the aforesaid centrifugal action and hence there is no danger of the lubricant escaping from the joint even when a light or thin oil is used.

The joint is composed of parts that are simple in construction and inexpensive to manufacture, and which are easily assembled, or disassembled for purposes of renewing any part should this become necessary.

Having thus described my invention, what I claim is:—

1. In a universal joint, the combination with a pair of hubs each having a pair of bearing blocks projecting therefrom, a connecting member having trunnions journaled in said bearing blocks, said connecting member having a main lubricant reservoir and said bearing blocks having auxiliary lubricant reservoirs adapted to receive lubricant from said main reservoir by centrifugal action, there being a restricted passageway between the ends of said trunnions and the wall of said bearing blocks for preventing excess pressure from lubricant in said auxiliary reservoir.

2. In a universal joint, the combination with a pair of hubs each having a pair of bearing blocks projecting therefrom, a connecting member having trunnions journaled in said bearing blocks, said connecting member having a main lubricant reservoir and said bearing blocks having auxiliary lubricant reservoirs adapted to receive lubricant from said main reservoir by centrifugal action, radially disposed passages extending through said trunnions and communicating with said main reservoir, the ends of said trunnions being spaced a slight distance from said bearing blocks to provide a restricted passageway therebetween, and means for conducting the lubricant escaping past the ends of said trunnions to said auxiliary reservoirs and to the trunnion bearing surfaces.

3. In a universal joint, the combination with a pair of hubs each having a pair of bearing blocks projecting therefrom, a bushing positioned in each bearing block, said bearing blocks each having a lubricant reservoir communicating with said bushing, a connecting member having trunnions journaled in said bushings, said connecting member having a main lubricant reservoir and radially disposed passages extending through said trunnions and a restricted passageway between the ends of said trunnions and the wall of said bearing blocks whereby to retard the flow of lubricant from said main reservoir to the reservoirs in said bearing blocks, and means for sealing the joints between said bearing blocks and connecting member.

4. In a universal joint, the combination with a pair of hubs each having a pair of bearing blocks projecting therefrom, a connecting member having trunnions journaled in said bearing blocks, said connecting member having a lubricant reservoir adapted to supply lubricant to said bearing blocks and trunnions, a groove formed in said connecting member about the base of each trunnion, and a restricted passageway between the ends of said trunnions and the walls of said bearing blocks, and a resilient packing washer positioned entirely within said grooves and adapted to seal the joints between said bearing blocks and connecting member.

In testimony whereof I hereunto affix my signature.

SAMUEL L. LAUGHLIN.